(12) United States Patent
McCormack et al.

(10) Patent No.: US 9,473,639 B2
(45) Date of Patent: Oct. 18, 2016

(54) SYSTEM AND METHOD FOR AGENT SELECTION IN AN ENTERPRISE

(71) Applicant: Avaya Inc., Santa Clara, CA (US)

(72) Inventors: Tony McCormack, Galway (IE); Joseph Smyth, Galway (IE); Paul D'Arcy, Galway (IE)

(73) Assignee: Avaya Inc., Basking Ridge, NJ (US)

( * ) Notice: Subject to any disclaimer, the term of this patent is extended or adjusted under 35 U.S.C. 154(b) by 0 days.

(21) Appl. No.: 14/533,454

(22) Filed: Nov. 5, 2014

(65) Prior Publication Data
US 2016/0127557 A1 May 5, 2016

(51) Int. Cl.
*H04M 3/00* (2006.01)
*H04M 5/00* (2006.01)
*H04M 3/523* (2006.01)
*G06F 17/30* (2006.01)

(52) U.S. Cl.
CPC ...... *H04M 3/5233* (2013.01); *G06F 17/30876* (2013.01)

(58) Field of Classification Search
CPC ........... H04M 3/5233; H04M 3/5232; H04M 2203/402; H04M 2203/407; H04M 2203/40

USPC ............ 379/265.12, 265.11, 265.05, 265.01, 379/265.06
See application file for complete search history.

(56) References Cited

U.S. PATENT DOCUMENTS

| | | | |
|---|---|---|---|
| 6,556,671 B1 | 4/2003 | Beauvois | |
| 7,372,952 B1* | 5/2008 | Wu | H04M 3/5233 370/352 |
| 2014/0254790 A1* | 9/2014 | Shaffer | H04M 3/5233 379/265.11 |
| 2015/0178660 A1* | 6/2015 | Nowak | G06Q 10/06398 705/7.42 |

* cited by examiner

Primary Examiner — Thjuan K Addy

(57) ABSTRACT

A resource selection management computer system and method for selecting at least one agent for at least one communication session includes a monitoring module for monitoring one or more parameters of the at least one communication session involving the at least one agent; a database for storing the one or more monitored parameters; a computing module for computing at least one data value based on the one or more monitored parameters by using at least one fuzzy logic; a determination module for determining at least one attribute of the agent based on the at least one computed data value; and an agent selection module for selecting at least one agent based on the at least one determined attribute.

16 Claims, 6 Drawing Sheets

SYSTEM AND METHOD FOR AGENT SELECTION IN AN ENTERPRISE

BACKGROUND

1. Field

Embodiments of the present invention generally relate to a system and method to manage efficiency of an enterprise and particularly to a system and method for selecting agents to handle incoming contacts in an enterprise or any work/resource selection system.

2. Description of Related Art

Contact centers or general work/resource selection management systems are often employed by enterprises to service, inbound and outbound contacts or customers. A primary objective of contact center management, for example, is to ultimately maximize contact center performance and profitability. An ongoing challenge in contact center administration is monitoring and optimizing contact center efficiency usage of its available resources. The contact center efficiency is generally measured by metrics such as Service Level Agreement (SLA), Customer Satisfaction (CSAT), and match rate. Contact center resources may include, agents, communication assets (e.g., number of voice trunks, number and bandwidth of video trunks, etc.), computing resources (e.g., a speed, a queue length, a storage space, etc.), and so forth.

Service level is one measurement of the contact center efficiency. Service level is typically determined by dividing the number of contacts accepted within a specified period by the number accepted plus number that were not accepted, but completed in some other way (e.g., abandoned, given busy, canceled, flowed out). Service level definitions may vary from one enterprise to another.

Match rate is another indicator used in measuring the contact center efficiency. Match rate is usually determined by dividing the number of contacts accepted by a primary skill level agent within a period of time by the number of contacts accepted by any agent in a queue over the same period. An agent with a primary skill level is one who typically may handle contacts of a certain nature more effectively and/or efficiently as compared to an agent of lesser skill level. There are other contact center agents who may not be as proficient as the primary skill level agent, and those agents are identified either as skill level agents or backup skill level agents. As can be appreciated, contacts received by a primary skill level agent are typically handled more quickly and accurately or effectively (e.g., higher revenue attained) than a contact received by a secondary or even backup skill level agent. Thus, it is an objective of most contact centers to optimize match rate along with the service level.

In addition to service level and match rate performance measures, contact centers use other Key Performance Indicators ("KPIs"), such as revenue, estimated, actual, or predicted wait time, average speed of answer, throughput, agent utilization, agent performance, agent responsiveness and the like, to calculate performance relative to their Service Level Agreements ("SLAs"). Operational efficiency is achieved when the KPIs are managed near, but not above, SLA threshold levels.

Throughput is a measure of the number of contacts/contact requests or work requests that may be processed in a given amount of time. Agent utilization is a measure of how efficiently the agents' time is being used. Customer service level is a measure of the time customers spend waiting for their work to be handled. Company contact center customers wish to provide service to as many requests as possible in a given amount of time, using the least number of agents to do so, and minimizing the wait time for their customers that may increase the Service Level Agreement (SLA) of the contact center. Further, the contact center may also have to maintain the Customer Satisfaction (CSAT) metrics in order to maintain the KPIs of the contact center. For this purpose, agents may have to maintain the quality of services provided to the customers through multimedia (e.g., voice contacts, video contacts, emails, etc.).

In today's scenario, efficiency of a contact center is increased when an appropriate agent is selected to provide customer services to incoming contacts. Conventionally, multiple routing techniques based on skills, contact needs, and so forth are being used to route incoming contacts to an appropriate agent of the contact center to provide better customer support services. Generally, in skill-based routing techniques, in order to select an appropriate agent, information associated with an incoming contact is gathered. The information is then mapped with skills defined within the contact center. These skills are the skills assigned to agents of the contact center. An agent can be assigned with multiple skills within the contact center. Further, an agent whose skills best matches with the gathered information is selected and the incoming contact is then routed to the selected agent of the contact center.

The same principle applies to attribute-based routing techniques. However, these conventional techniques require a cumbersome task to map information with attributes assigned to agents of the contact center to select an appropriate agent. Further, these techniques lack in determining attributes of an agent associated with an incoming contact for the purpose of selecting an appropriate agent. Further, critical information may be ignored at the time of mapping information with attributes of agents of the contact center.

There is thus a need for a system and method for selecting an appropriate agent to improve handling of an incoming contact in an enterprise or any work/resource selection system.

SUMMARY

Embodiments in accordance with the present invention provide a resource selection management computer system for selecting at least one agent for at least one communication session in an enterprise. The resource selection management computer system includes a monitoring module for monitoring one or more parameters of the at least one communication session involving the at least one agent. The system further includes a database for storing the one or more monitored parameters. The system further includes a computing module for computing at least one data value based on the one or more monitored parameters by using at least one fuzzy logic. The system further includes a determination module for determining at least one attribute of the at least one agent based on the at least one computed data value. The system further includes an agent selection module for selecting the at least one agent based on the at least one determined attribute.

Embodiments in accordance with the present invention further provide a computer-implemented method for selecting at least one agent for at least one communication session in an enterprise. The method includes monitoring one or more parameters of the at least one communication session involving the at least one agent; storing the one or more monitored parameters in a database; computing at least one data value based on the one or more monitored parameters by using at least one fuzzy logic; determining at least one attribute of the at least one agent based on the at least one computed data value; and selecting the at least one agent based on the at least one determined attribute.

Embodiments in accordance with the present invention further provide a computer-implemented method for routing at least one communication session to at least one agent of an enterprise. The method includes monitoring one or more parameters of the at least one communication session involving the at least one agent; storing the one or more monitored parameters in a database; computing at least one data value based on the one or more monitored parameters by using at least one fuzzy logic; determining at least one attribute of the at least one agent based on the at least one computed data value; selecting the at least one agent based on the at least one determined attribute; and routing the at least one communication session to the at least one selected agent.

Embodiments of the present invention may provide a number of advantages depending on its particular configuration. First, embodiments of the present application provide a system and a method for selecting an appropriate agent for a communication session in a resource selection management system. Embodiments of the present application provide a resource selection management computer system that determines attributes required by an agent of the resource selection management system to provide support services to incoming contacts. Next, embodiments of the present application utilize fuzzy logic to determine attributes required by an agent of the management system. Further, embodiments of the present application generate an alert and/or notification if uncertainty in the determined attributes is detected. Then a supervisor of the resource selection management system may automate and/or manual adjust the fuzzy logic.

These and other advantages will be apparent from the present application of the embodiments described herein.

The preceding is a simplified summary to provide an understanding of some embodiments of the present invention. This summary is neither an extensive nor exhaustive overview of the present invention and its various embodiments. The summary presents selected concepts of the embodiments of the present invention in a simplified form as an introduction to the more detailed description presented below. As will be appreciated, other embodiments of the present invention are possible utilizing, alone or in combination, one or more of the features set forth above or described in detail below.

BRIEF DESCRIPTION OF THE DRAWINGS

The above and still further features and advantages of embodiments of the present invention will become apparent upon consideration of the following detailed description of embodiments thereof, especially when taken in conjunction with the accompanying drawings, and wherein.

Figure 1A:
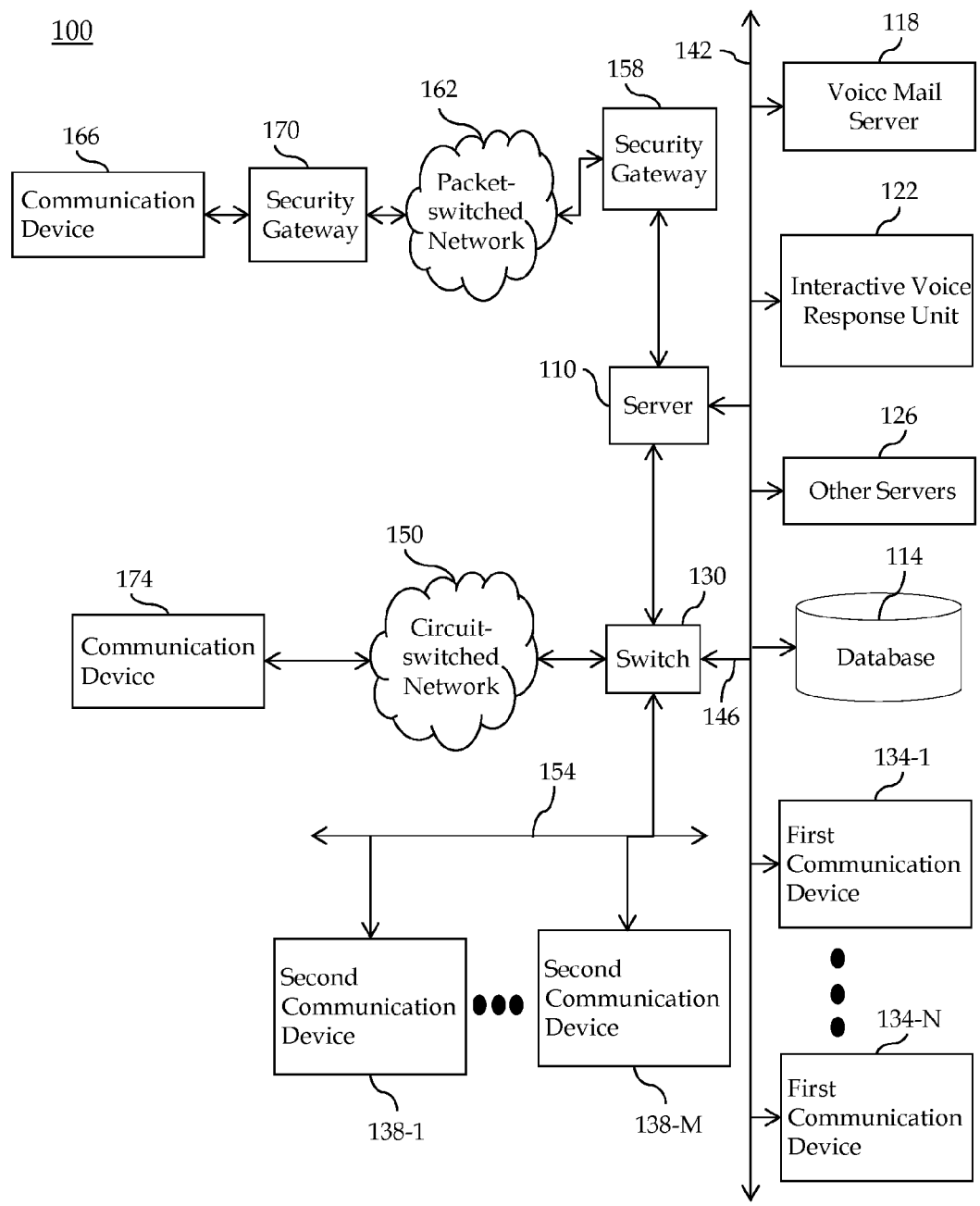
FIG. 1A illustrates a block diagram depicting a contact center or other resource selection management system, according to an embodiment of the present invention.

The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include", "including", and "includes" mean including but not limited to. To facilitate understanding, like reference numerals have been used, where possible, to designate like elements common to the figures. Optional portions of the figures may be illustrated using dashed or dotted lines, unless the context of usage indicates otherwise.

DETAILED DESCRIPTION

Embodiments of the present invention will be illustrated below in conjunction with an exemplary communication system, e.g., the Avaya Aura® system. However, embodiments relating to work/resource selection management systems are also contemplated by the present invention and are to be considered within the scope of the present invention. Although well suited for use with, e.g., a system having an Automatic Call Distribution (ACD) or other similar contact processing switch, embodiments of the present invention are not limited to any particular type of communication system switch or configuration of system elements. Those skilled in the art will recognize the disclosed techniques may be used in any communication application in which it is desirable to provide improved contact processing.

The phrases "at least one", "one or more", and "and/or" are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together.

The term "a" or "an" entity refers to one or more of that entity. As such, the terms "a" (or "an"), "one or more" and "at least one" can be used interchangeably herein. It is also to be noted that the terms "comprising", "including", and "having" can be used interchangeably.

The term "automatic" and variations thereof, as used herein, refers to any process or operation done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material".

The term "computer-readable medium" as used herein refers to any tangible storage and/or transmission medium that participate in providing instructions to a computer processor for execution. Such a medium may take many forms, including but not limited to, non-volatile media, volatile media, and transmission media. Non-volatile media includes, for example, NVRAM, or magnetic or optical disks. Volatile media includes dynamic memory, such as main memory. Common forms of computer-readable media include, for example, a floppy disk, a flexible disk, hard disk, magnetic tape, or any other magnetic medium, magneto-optical medium, a CD-ROM, any other optical medium, punch cards, paper tape, any other physical medium with patterns of holes, a RAM, a PROM, and EPROM, a FLASH-EPROM, a solid state medium like a memory card, any other memory chip or cartridge, a carrier wave as described hereinafter, or any other medium from which a computer processor can read.

The terms "customer" and "contact" may be used interchangeably in certain context of this disclosure of the present invention when referring to one or more persons/entity contacting a contact center, usually to reach an IVR system and/or one or more agents for assistance. In another context contemplated by the present invention, a "customer" may have more than one contact with the contact center at, or nearly at, the same time. For example, a customer may communicate with a contact center by way of telephone and by way of a chat, thus counting as one customer but two contacts.

A digital file attachment to e-mail or other self-contained information archive or set of archives is considered a distribution medium equivalent to a tangible storage medium. When the computer-readable media is configured as a database, it is to be understood the database may be any type of database, such as relational, hierarchical, object-oriented, and/or the like. Accordingly, embodiments may include a tangible storage medium or distribution medium and prior art-recognized equivalents and successor media, in which the software embodiments of the present invention are stored.

The terms "determine", "calculate" and "compute," and variations thereof, as used herein, are used interchangeably and include any type of methodology, process, mathematical operation or technique.

The term "module" as used herein refers to any known or later developed hardware, software, firmware, artificial intelligence, fuzzy logic, or combination of hardware and software that is capable of performing the functionality associated with that element. Also, while the present invention is described in terms of exemplary embodiments, it should be appreciated those individual aspects of the present invention can be separately claimed.

The term "switch" or "server" as used herein should be understood to include a Private Branch Exchange (PBX), an ACD, an enterprise switch, or other type of communications system switch or server, as well as other types of processor-based communication control devices such as media servers, computers, adjuncts, etc.

FIG. 1A shows an illustrative embodiment of the present invention. A contact center 100 comprises a server 110, a set of data stores or databases 114 containing contact or customer related information, resource or agent related information and other information that may enhance the value and efficiency of the contact processing, and a plurality of servers, namely a voice mail server 118, an Interactive Voice Response unit (e.g., IVR) 122, and other servers 126, a switch 130, a plurality of working agents operating packet-switched (first) communication devices 134-1-N (such as computer work stations or personal computers), and/or circuit-switched (second) communication devices 138-1-M, all interconnected by a Local Area Network (LAN) 142, (or Wide Area Network (WAN)). In another embodiment of the present invention, the customer and agent related information may be replicated over multiple repositories.

The servers may be connected via optional communication lines 146 to the switch 130. As will be appreciated, the other servers 126 may also include, but is not restricted to, a scanner (which is normally not connected to the switch 130 or Web Server), VoIP software, video call software, voice messaging software, an IP voice server, a fax server, a web server, an email server, and the like. The switch 130 is connected via a plurality of trunks to a circuit-switched network 150 (e.g., Public Switch Telephone Network (PSTN)) and via link(s) 154 to the second communication devices 138-1-M. A security gateway 158 is positioned between the server 110 and a packet-switched network 162 to process communications passing between the server 110 and the packet-switched network 162. In an embodiment of the present invention, the security gateway 158 (as shown in FIG. 1A) may be Avaya Inc.'s, G700 Media Gateway™ and may be implemented as hardware such as via an adjunct processor (as shown) or as a chip in the server 110.

The switch 130 and/or server 110 may be any architecture for directing contacts to one or more communication devices. In some embodiments of the present invention, the switch 130 may perform load-balancing functions by allocating incoming or outgoing contacts among a plurality of logically and/or geographically distinct contact centers. Illustratively, the switch 130 and/or server 110 may be a modified form of the subscriber-premises equipment sold by Avaya Inc. under the names Definity™ Private-Branch Exchange (PBX) based ACD system, MultiVantage™ PBX, Communication Manager™, 58300™ media server and any other media servers, SIP Enabled Services™, Intelligent Presence Server™, and/or Avaya Interaction Center™, and any other products or solutions offered by Avaya, or another company.

Typically, the switch 130/server 110 is a stored-program-controlled system that conventionally includes interfaces to external communication links, a communications switching fabric, service circuits (e.g., tone generators, announcement circuits, etc.), memory for storing control programs and data, and a processor (i.e., a computer) for executing the stored control programs to control the interfaces and the fabric and to provide ACD functionality. Other types of known switches and servers are well known in the art and therefore not described in detail herein.

The first communication devices 134-1-N are packet-switched and may include, for example, IP hardphones such as the Avaya Inc.'s, 4600 Series IP Phones™, IP softphones such as Avaya Inc.'s, IP Softphone™, Personal Digital Assistants (PDAs), Personal Computers (PCs), laptops, packet-based H.320 video phones and conferencing units, packet-based voice messaging and response units, packet-based traditional computer telephony adjuncts, peer-to-peer based communication devices, and any other communication device.

The second communication devices 138-1-M are circuit-switched devices. Each of the second communication devices 138-1-M corresponds to one of a set of internal extensions Ext-1-M, respectively. The second communication devices 138-1-M may include, for example, wired and wireless telephones, PDAs, H.320 videophones and conferencing units, voice messaging and response units, traditional computer telephony adjuncts, and any other communication devices.

It should be noted that the embodiments of present invention do not require any particular type of information transport medium between switch, or server and first and second communication devices, i.e., the embodiments of the present invention may be implemented with any desired type of transport medium as well as combinations of different types of transport channels.

The packet-switched network 162 may be any data and/or distributed processing network, such as the Internet. The packet-switched network 162 typically includes proxies (not shown), registrars (not shown), and routers (not shown) for managing packet flows.

The packet-switched network 162 as shown in FIG. 1A is in communication with a first communication device 166 via a security gateway 170, and the circuit-switched network 150 with an external second communication device 174.

In one configuration, the server 110, the packet-switched network 162, and the first communication devices 134-1-N are Session Initiation Protocol (SIP) compatible and may include interfaces for various other protocols such as the Lightweight Directory Access Protocol (LDAP), H.248, H.323, Simple Mail Transfer Protocol (SMTP), IMAP4, ISDN, E1/T1, and analog line or trunk.

It should be emphasized the configuration of the switch 130, the server 110, user communication devices, and other elements as shown in FIG. 1A is for purposes of illustration only and should not be construed as limiting embodiments of the present invention to any particular arrangement of elements.

Further, the server 110 is notified via the LAN 142 of an incoming service request or work item by the communications component (e.g., switch 130, a fax server, an email server, a web server, and/or other servers) receiving the incoming service request as shown in FIG. 1A. The incoming service request is held by the receiving telecommunications component until the server 110 forwards instructions to the component to forward or route the contact to a specific contact center resource, such as the IVR unit 122, the voice mail server 118, and/or first or second telecommunication device 134-1-N, 138-1-M associated with a selected agent.

Figure 1B:
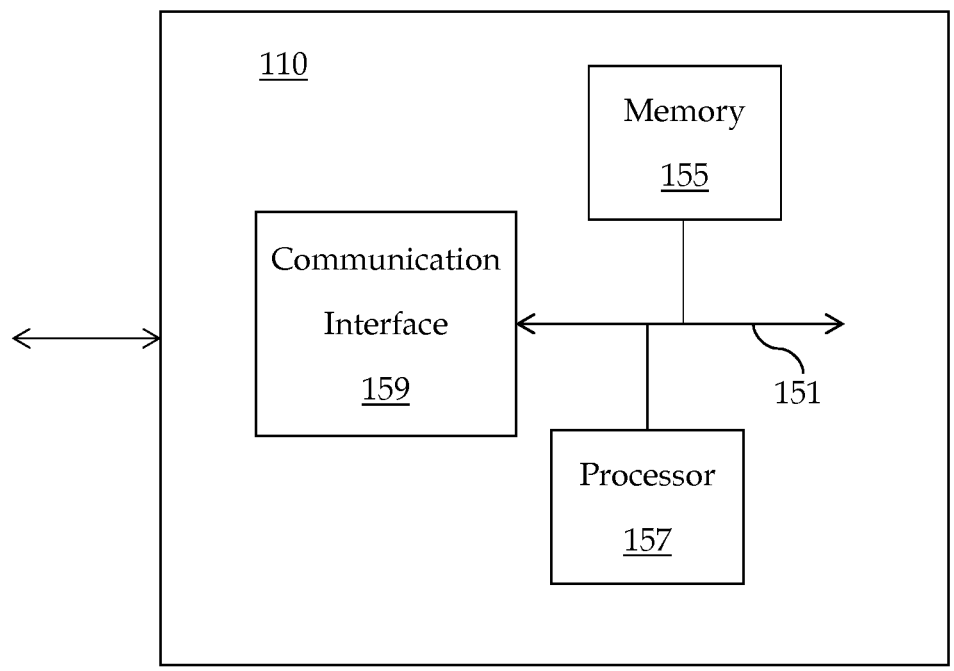
FIG. 1B illustrates a high level hardware abstraction of a block diagram of a server, according to an embodiment of the present invention.

FIG. 1B illustrates at a relatively high-level hardware abstraction of a block diagram of a server such as the server 110, in accordance with an embodiment of the present invention. The server 110 may also depict a work/resource selection management system other than a contact center. The server 110 may include an internal communication interface 151 that interconnects a processor 157, a memory 155 and a communication interface circuit 159. The communication interface circuit 159 may include a receiver and transmitter (not shown) to communicate with other elements of the contact center 100 such as the switch 130, the security gateway 158, the LAN 142, and so forth. By use of programming code and data stored in the memory 155, the processor 157 may be programmed to carry out various functions of the server 110.

Although embodiments are discussed with reference to client-server architecture, it is to be understood the principles of embodiments of the present invention apply to other network architectures. For example, embodiments of the present invention apply to peer-to-peer networks, such as those envisioned by the Session Initiation Protocol (SIP). In the client-server model or paradigm, network services and the programs used by end users to access the services are described.

The client side provides a user with an interface for requesting services from the network, and the server side is responsible for accepting user requests for services and providing the services transparent to the user. By contrast in the peer-to-peer model or paradigm, each networked host runs both the client and server parts of an application program. Additionally, embodiments of the present invention do not require the presence of packet- or circuit-switched networks.

The term "switch" or "server" as used herein should be understood to include a Private Branch Exchange (PBX), an ACD, an enterprise switch, an enterprise server, or other type of telecommunications system switch or server, as well as other types of processor-based communication control devices such as media servers, computers, adjuncts, etc.

Figure 2:
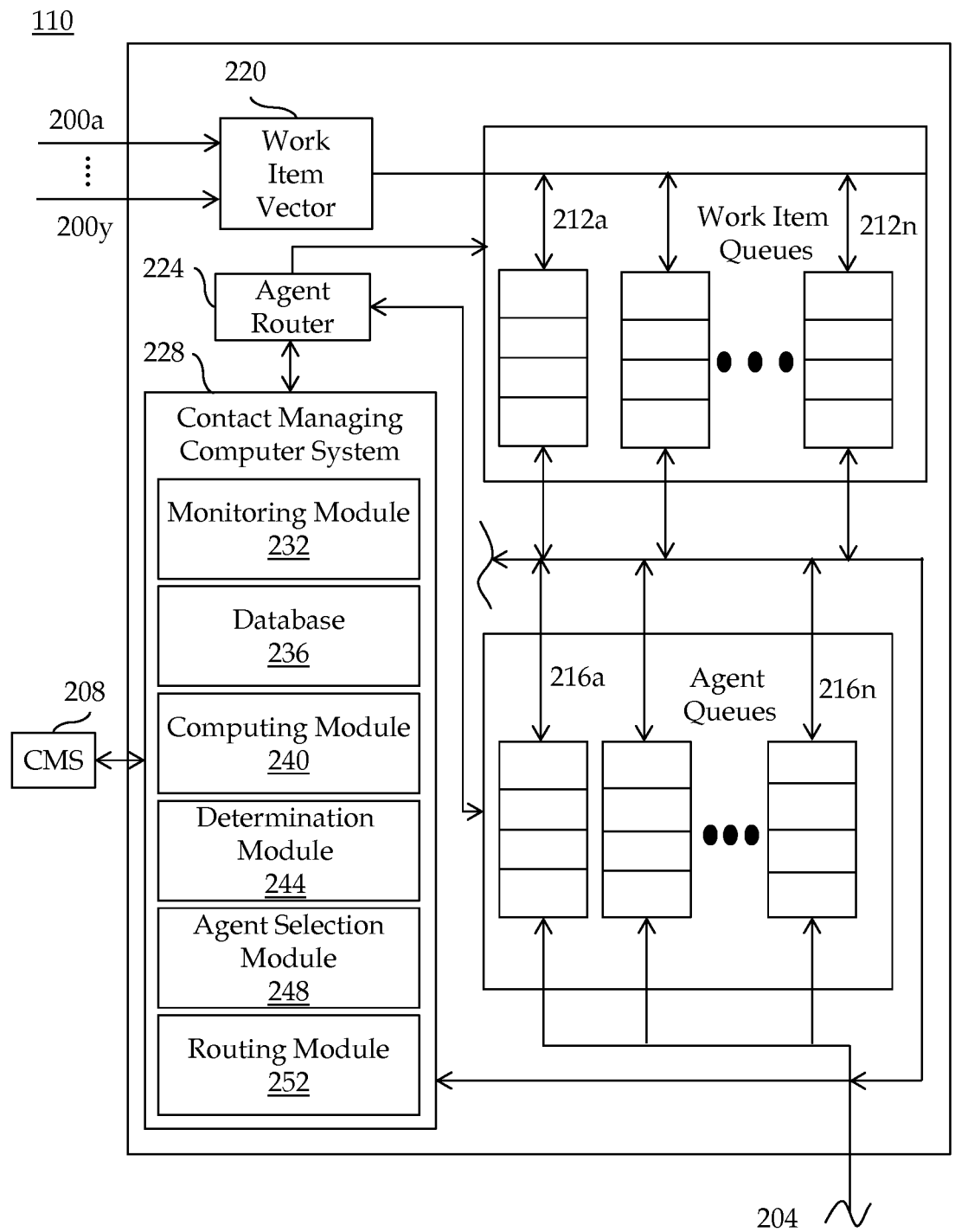
FIG. 2 illustrates a functional block diagram of the server that may be used in the contact center or resource selection management system, according to an embodiment of the present invention.

Referring to FIG. 2, one possible configuration of the server 110 is depicted at a relatively high level of functional abstraction, according to an embodiment of the present invention. The server 110 is in communication with a plurality of contact or customer communication lines 200$a$-$y$ (which may be one or more trunks, phone lines, etc.) and an agent communication line 204 (which may be a voice-and-data transmission line such as the LAN 142 and/or a circuit switched voice line). The server 110 may include Avaya Inc.'s Operational Analyst™ (OA) with On-Line Analytical Processing (OLAP) technology or a Call Management System (CMS) 208 that gathers contact records. OA and CMS will hereinafter be referred to jointly as CMS 208.

As shown in FIG. 2, among the data stored in the server 110 is a set of contact or work/resource item queues 212$a$-$n$ and a separate set of agent queues 216$a$-$n$. Each contact queue 212$a$-$n$ corresponds to a different set of agent queues, as does each agent queue 216$a$-$n$. Conventionally, contacts are either prioritized or are queued in individual ones of the contact queues 212$a$-$n$ in their order of priority or are queued in different ones of a plurality of contact queues that correspond to a different priority. Likewise, each agent's queues are prioritized according to his or her level of expertise or skill in that queue, and agents are queued in either individual ones of agent queues 216$a$-$n$ in their order of expertise level or in different ones of a plurality of agent queues 216$a$-$n$ that correspond to a queue and each one of which corresponds to a different expertise level. In an embodiment of the present invention, the agent queue 216$a$-$n$ may include a set of reserve agents queue in the contact center 100.

According to an embodiment of the present invention, included among the control programs in the server 110 is a work item vector 220. Contacts or work items incoming to the contact center 100 are assigned by the work item vector 220 to different work item queues 212$a$-$n$ based upon a number of predetermined criteria, including a customer's identity, customer needs, contact center needs, current contact center queue lengths, a customer value, and an agent skill that is required for proper handling of the contact.

Agents who are available for handling work items are assigned to the agent queues 216$a$-$n$ based upon the skills and/or attributes they possess. An agent may have multiple skills and/or attributes, and therefore may be assigned to multiple agent queues 216$a$-$n$ simultaneously. Furthermore, an agent may have different levels of skill expertise (e.g., skill levels 1-N in one configuration or merely primary skill levels and secondary skill levels in another configuration), and therefore may be assigned to different agent queues 216$a$-$n$ at different expertise levels.

In one configuration, the contact center 100 is operated by a contact operator (e.g., a supervisor or a manager of the contact center 100), and each of the work item queues 212$a$-$n$, and possibly each of the agent queues 216$a$-$n$, corresponds to a different client. Each client may have a separate Service Level Agreement (SLA) or other type of performance measurement agreement with the contact operator regarding performance expectations, goals, requirements or specifications for the client's respective queue(s).

Further, embodiments in accordance with the present invention may include, among the programs executing on the server 110, an agent router 224 and a contact managing computer system 228. The agent router 224 and the contact managing computer system 228 are stored either in the main memory or in a peripheral memory (e.g., disk, CD ROM, etc.) or some other computer-readable medium of the contact center 100. Further, the agent router 224 monitors the occupants of the contact and agent queues 212a-n and 216a-n, respectively, and contact center objectives, rules, and policies and assigns agents to service work items.

The agent router 224 distributes and connects these contacts to communication devices of available agents based on the predetermined criteria noted above. When the agent router 224 forwards a contact (or first work item) to an agent, the agent router 224 also forwards customer-related information from the database 114 to the agent's desktop or computer work station for previewing and/or viewing (such as by a pop-up display) to enable the agent for providing better services to the contact. Depending on the contact center configuration, the agent router 224 may reallocate the contacts to the agents of the contact center 100. The agents process the contacts or work items sent to them by the agent router 224.

In an embodiment of the present invention, the agent and their associated data are maintained and updated in the database 114 of the contact center 100. Upon the completion of handling an incoming contact, a generator (not shown) collects selected metrics for the contact. These metrics may include, but is not restricted to, skills involved in servicing the contact, an identifier of a servicing agent, contact duration, a transaction or contact type (e.g., sale, information request, complaint, etc.), time-of-day, result of the contact (e.g., type of sale, number of units sold, an average revenue generated, etc.), and so forth. The metrics along with other statistics is typically gathered by the CMS 208.

According to an embodiment of the present invention, the contact managing computer system 228 includes certain modules, such as, but is not restricted to, a monitoring module 232, a database 236, a computing module 240, a determination module 244, an agent selection module 248, and a routing module 252. In some embodiments, one or more of the monitoring module 232, the database 236, the computing module 240, the determination module 244, the agent selection module 248, and the routing module 252 may be implemented by one or more software processes running on the server 110. In an embodiment of the present invention, the database 236 may be the same database 114. The database 236 may be stored outside the contact managing computer system 228, in another embodiment of the present invention. The server 110 may implement one or more software processes by use of the processor 157 being suitably programmed by use of software instructions stored in the memory 155 coupled to the processor 157.

The monitoring module 232 may monitor a type of an incoming communication session to the contact center 100, according to an embodiment of the present invention. The type of the communication session, i.e., whether the communication session made by a customer is, but is not restricted to, a video session, a voice session, a Voice over Internet Protocol (VoIP), a text message, an email, an instant messaging, a web chat, and so forth. The monitoring module 232 may further monitor static details about the communication session, for example, a customer selects input in an IVR menu of the contact center 100. In an exemplary scenario, if a customer selects a button "3" for a 'mobile phone' in an IVR menu and further selects a button "5" for an 'inquiry', then it is determined that the customer desires to inquire about a mobile phone. Further, the monitoring module 232 may monitor context of the communication session, according to an embodiment of the present invention. The monitoring module 232 may monitor the context of the communication session by monitoring browsing history of the customer, in an embodiment of the present invention. For example, the customer is searching for a mobile phone from past 20 minutes on a web page associated with the contact center 100.

Further, the monitoring module 232 may monitor a type of a customer, according to an embodiment of the present invention. In an exemplary scenario, a customer may be, but is not restricted to, a high priority or a gold customer, a medium priority customer, and/or a low priority or a silver customer. A high priority customer may be a customer having higher revenue products and/or services of the contact center 100. A medium priority customer may be a customer having medium revenue products and/or services of the contact center 100. Further, a low priority customer may be a customer having low revenue products and/or services or a potential customer of the contact center 100. In an embodiment of the present invention, the monitoring module 232 may gather the type of a customer from the database 236.

Furthermore, the monitoring module 232 may monitor sentiments of the customer and/or agent during the communication session, in an embodiment of the present invention. The sentiments may include, but is not restricted to, a positive sentiment, a negative sentiment, a neutral sentiment, and so forth. The positive sentiment may indicate that the customer is happy and satisfied from customer services of the contact center 100. Examples of the positive sentiments may be, but is not restricted to, fulfilled, glad, optimistic, and so forth. The negative sentiments may indicate that the customer is unhappy and unsatisfied from customer services of the contact center 100. Examples of the negative sentiment may be, but is not restricted to, frustrated, angry, irritated, and so forth. The neutral sentiment may indicate that the customer is not fully satisfied or happy but is not fully unsatisfied or unhappy from the customer services of the contact center 100. In an embodiment of the present invention, the monitoring module 232 may detect sentiments of an agent and/or customer from start of the communication session to an end of the communication session. For example, sentiments at the start of a communication session may be okay but recovers as the communication session proceeds. The monitoring module 232 may also detect the sentiments in non-voice communication sessions, for example, text messages, emails, instant messages, web chats, and so forth.

In an embodiment of the present invention, parameters of a communication session may include, but are not restricted to, a type of a communication session, a type of a customer, static details of a communication session, sentiments of agent and/or customer, or a combination thereof. In an embodiment of the present invention, the monitoring module 232 may monitor parameters of the communication session from an ongoing communication session in a real time environment. In another embodiment of the present invention, the monitoring module 232 may monitor and/or gather parameters of the communication session from historical data and/or browsing history of customers stored in a database such as the database 114 or the database 236. The monitoring module 232 may monitor parameters of the communication session by mining data from ongoing interaction of the customer with a web page associated with the contact center 100.

Further, the monitoring module 232 may extract keywords from the monitored parameters of the communication session, according to an embodiment of the present invention. In an exemplary scenario, the customer provides information by selecting inputs in an IVR menu that the customer desires to interact with an agent proficient in providing services associated with mobile phones and inquiry, and who is least occupied with work items, then "mobile phone", "inquiry", and "least occupied agent" may be extracted as keywords for the communication session. In an exemplary scenario, the monitoring module 232 may analyze text and extract keywords from a textual communication session such as an instant messaging, a text message, an email, a web chat, and so forth. Next, if the type of the communication session is a voice session, then the monitoring module 232 may convert speech of the customer into text by a voice recognition module (not shown), which is then monitored to extract keywords for the communication session.

The database 236 may store the monitored parameters of the communication session, in an embodiment of the present invention. The database 236 may also store keywords extracted from the communication session, in another embodiment of the present invention. Further, the database 236 may store browsing history of customers on the web page associated with the contact center 100. In an exemplary scenario, the browsing history may include, but is not restricted to, time spent on a web page, number of items in shopping cart, a type of items viewed by the customer, and so forth. In an embodiment of the present invention, the monitored parameters and/or other data may be replicated over multiple repositories. In another embodiment of the present invention, the database 236 may provide the stored data to the monitoring module 232.

The computing module 240 may assign a fuzzy value to each of the monitored parameters of the communication session, according to an embodiment of the present invention. The fuzzy value may indicate a value of each of the monitored parameters associated with the communication session of the contact center 100. In an embodiment of the present invention, the fuzzy value may be assigned as, but is not restricted to, low, average, high, huge, and so forth. In another embodiment of the present invention, the fuzzy value may be a numeric value such as 1, 5, 40, 90, and so forth.

In an exemplary scenario, if a positive sentiment of the agent is determined, then a fuzzy value, for example, a fuzzy value more than "50" on a scale of 1 to 100 is assigned to the monitored sentiment parameter, and if a negative sentiment is determined, then a low fuzzy value, for example, a fuzzy value less than "50" is assigned to the monitored sentiment parameter. In another exemplary scenario, if the customer is a high priority customer, then a fuzzy value "9" on a scale of 1 to 10 is assigned and if the customer is a low priority customer, then a fuzzy value "2" is assigned to the type of customer value parameter.

Further, the computing module 240 may compute a data value based on the monitored parameters of the communication session, according to an embodiment of the present invention. The data value may indicate a data value of the communication session, in an embodiment of the present invention. The computing module 240 may compute a data value based on the monitored parameters by using fuzzy rules, in an embodiment of the present invention. While applying fuzzy rules on the monitored parameters, the computing module 240 may use operators, for example, AND, OR, and NOT. In an exemplary scenario, if sentiment parameter is angry, type of customer is high then a fuzzy rule, for example, if-then fuzzy rule is applied to the fuzzy values of the monitored parameters, for example:
If sentiment is angry AND type of customer is high then data value is high The computing module 240 may also apply fuzzy rules on other monitored parameters of the communication session, for example,
If sentiment is angry OR type of customer is high then data value is high In an embodiment of the present invention, the computing module 240 may apply fuzzy rules on multiple monitored parameters of the communication session, for example,
If sentiment is angry or type of customer is average AND type of session is video session then data value is average In an embodiment of the present invention, a mathematical algorithm may be used to compute the data value based on the monitored parameters of the communication session.

Further, the computing module 240 may compute the data value of the communication session by utilizing data associated with the contact center 100, according to an embodiment of the present invention. The data may include, but is not restricted to, contact center operational data such as service levels, calendar information, and so forth.

The determination module 244 may determine attributes based on the computed data value of the communication session, according to an embodiment of the present invention. The determined attributes may indicate characteristics and/or skills required by an agent of the contact center 100 to provide customer services to incoming communication sessions. In an exemplary scenario, if data value of a communication session is low, then an attribute such as low skilled is determined for the communication session. Further, the determination module 244 may determine multiple attributes based on the computed data value of the communication session, in another embodiment of the present invention. In an exemplary scenario, if data value of the communication session is high, then attributes such as proficient in "English", highly skilled, and so forth, associated with the data value are determined.

Moreover, the computing module 240 may generate alerts to manually adjust and/or modify the fuzzy rules applied to the parameters of the communication session, according to an embodiment of the present invention.

The agent selection module 248 may select a resource based on the determined attributes, according to an embodiment of the present invention. The agent selection module 248 may match the determined attributes with characteristics and/or skills assigned to agents of the contact center 100 in order to select an appropriate resource for the communication session. The selected resource may be, but is not restricted to, a supervisor, an agent, a reserve agent, a Subject Matter Expert (SME), to name a few. In an embodiment of the present invention, the agent selection module 248 may automatically select an agent based on the determined attributes. In another embodiment of the present invention, the agent selection module 248 may enable a supervisor of the contact center 100 to manually select a resource based on the determined attributes.

The routing module 252 may route the communication session to the agent selected, according to an embodiment of the present invention. In an exemplary scenario, the communication session is routed to the selected agent of the contact center 100 if the selected agent is currently available. In another exemplary scenario, the communication session is routed to a queue if the selected agent is currently handling another communication session within the contact center 100.

Figure 3:
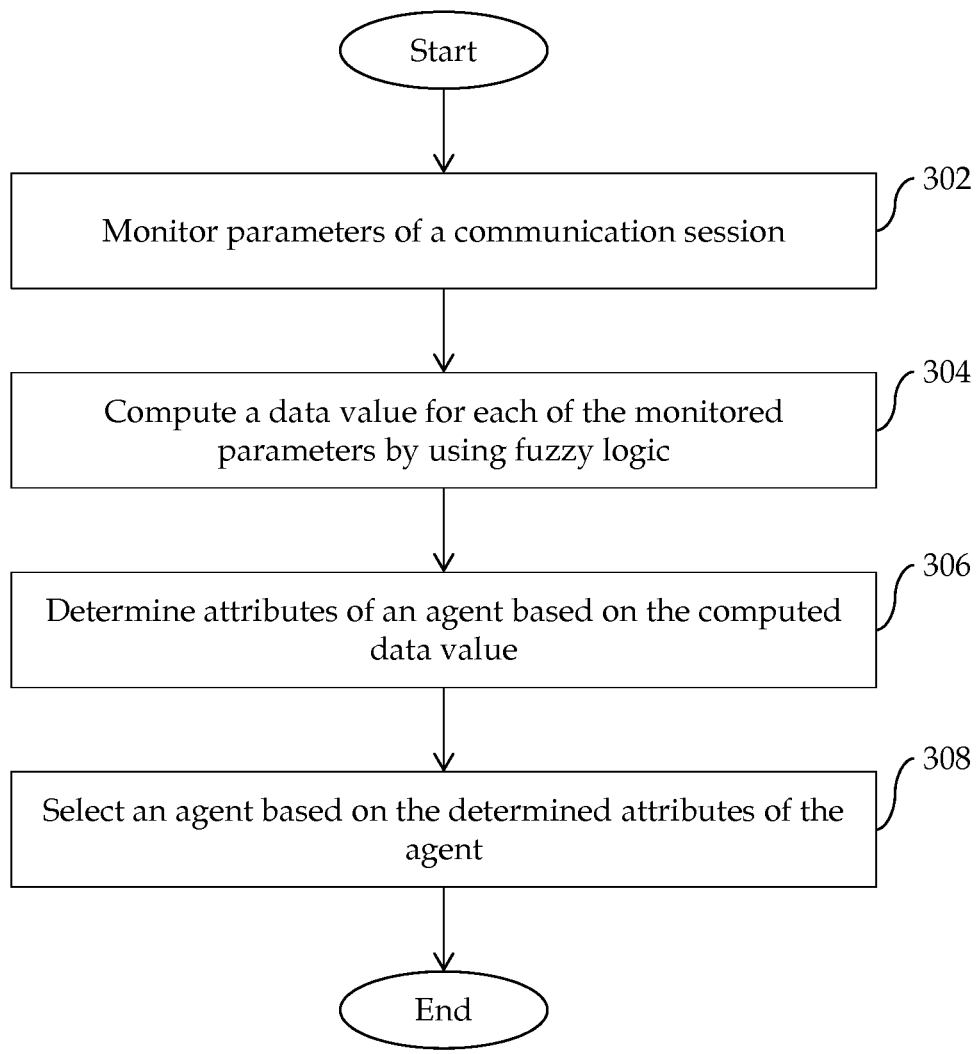
FIG. 3 depicts a flowchart of a method for selecting an agent for a communication session in the contact center or resource selection management system, according to an embodiment of the present invention.

FIG. 3 depicts a flowchart of a method for selecting an agent for a communication session in the contact center 100, according to an embodiment of the present invention.

At step 302, a contact managing computer system 228 monitors a type of a communication session to the contact center 100, according to an embodiment of the present invention. The type of the communication session, i.e., whether the communication session made by a customer is, but is not restricted to, a video session, a voice session, a Voice over Internet Protocol (VoIP), a text message, an email, an instant messaging, a web chat, and so forth. The contact managing computer system 228 further monitor static details about the communication session, for example, a customer selects input in an IVR menu of the contact center 100. Further, the contact managing computer system 228 monitors context of the communication session, according to an embodiment of the present invention by monitoring browsing history of the customer, in an embodiment of the present invention.

Further, the contact managing computer system 228 monitors a type of a customer, according to an embodiment of the present invention. In an exemplary scenario, a customer may be, but is not restricted to, a high priority or a gold customer, a medium priority customer, and/or a low priority or a silver customer. In an embodiment of the present invention, the contact managing computer system 228 gathers the type of a customer from the database 236. Furthermore, the contact managing computer system 228 monitors sentiments of the customer during the communication session, in an embodiment of the present invention. The sentiments may include, but is not restricted to, a positive sentiment, a negative sentiment, a neutral sentiment, and so forth. In an embodiment of the present invention, the contact managing computer system 228 detects sentiments of a customer from start of the communication session to an end of the communication session. The contact managing computer system 228 also detects the sentiments in non-voice communication sessions, for example, text messages, emails, instant messages, web chats, and so forth.

In an embodiment of the present invention, parameters of a communication session may include, but are not restricted to, a type of a communication session, a type of a customer, static details of a communication session, sentiments of a customer, or a combination thereof. In an embodiment of the present invention, the contact managing computer system 228 monitors parameters of the communication session from an ongoing communication session in a real time environment. In another embodiment of the present invention, the contact managing computer system 228 monitors and/or gather parameters of the communication session from historical data and/or browsing history stored in a database such as the database 114 or the database 236. The contact managing computer system 228 monitor parameters of the communication session by mining data from ongoing interaction of the customer with a web page associated with the contact center 100.

Further, the contact managing computer system 228 extracts keywords from the monitored parameters of the communication session, according to an embodiment of the present invention.

At step 304, the contact managing computer system 228 assigns a fuzzy value to each of the monitored parameters of the communication session, according to an embodiment of the present invention. The fuzzy value may indicate a value of each of the monitored parameters associated with the communication session of the contact center 100. In an embodiment of the present invention, the fuzzy value may be assigned as, but is not restricted to, low, average, high, huge, and so forth. In another embodiment of the present invention, the fuzzy value may be a numeric value such as 1, 5, 40, 90, and so forth.

Further, the contact managing computer system 228 computes a data value based on the monitored parameters of the communication session, according to an embodiment of the present invention. The data value may indicate a data value of the communication session, in an embodiment of the present invention. The contact managing computer system 228 computes a data value based on the monitored parameters by using fuzzy logic, in an embodiment of the present invention. In an exemplary scenario, if sentiment parameter is happy, type of customer is high then a fuzzy rule, for example, if-then fuzzy rule is applied to the fuzzy values of the monitored parameters, such as:

If sentiment is happy AND type of customer is high then data value is low

In an embodiment of the present invention, the contact managing computer system 228 applies fuzzy rules on multiple monitored parameters of the communication session, for example, If sentiment is happy OR type of customer is low AND type of session is video session then data Value is Average Next, at step 306, the contact managing computer system 228 determines attributes based on the computed data value of the communication session, according to an embodiment of the present invention. The determined attributes may indicate characteristics and/or skills required by an agent of the contact center 100 to provide customer services to incoming communication sessions. In an exemplary scenario, if data value of a contact priority is low, then an attribute such as low skilled is determined for the communication session. Further, the contact managing computer system 228 determines multiple attributes based on the computed data value of the communication session, in another embodiment of the present invention. In an exemplary scenario, if data value of the communication session is high then attributes such as proficient in "English", highly skilled, and so forth, associated with an agent are determined.

At step 308, the contact managing computer system 228 selects a resource based on the determined attributes, according to an embodiment of the present invention. The contact managing computer system 228 matches the determined attributes with characteristics and/or skills assigned to agents of the contact center 100 in order to select an appropriate resource for the communication session. The selected resource may be, but is not restricted to, a supervisor, an agent, a reserve agent, a Subject Matter Expert (SME), and so forth.

Figure 4:
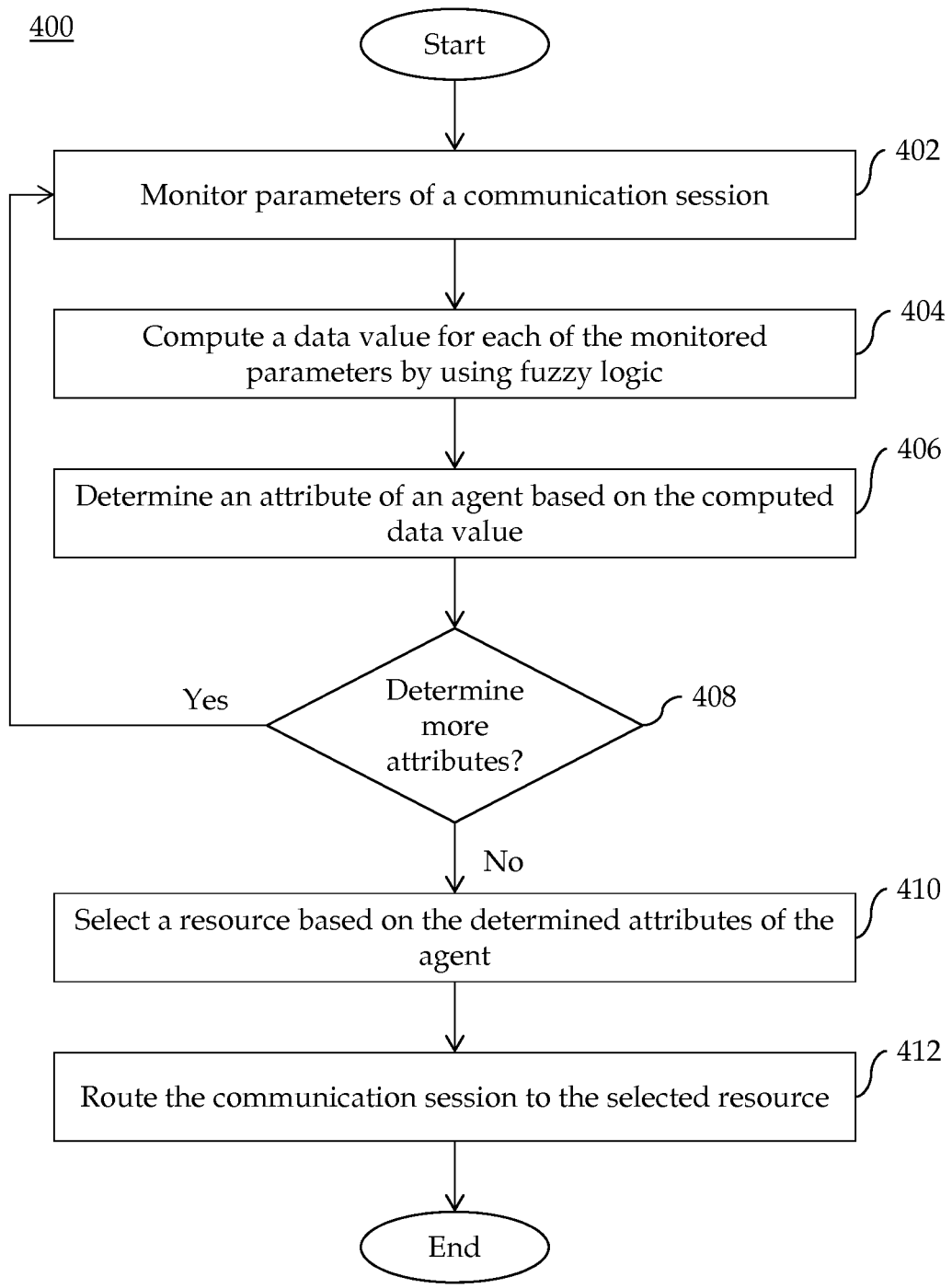
FIG. 4 depicts a flowchart of a method for selecting an agent for a communication session in the contact center or resource selection management system, according to another embodiment of the present invention.

FIG. 4 depicts a flowchart of a method 400 for selecting an agent for a communication session in the contact center 100, according to another embodiment of the present invention.

At step 402, a contact managing computer system 228 monitors a type of a communication session to the contact center 100, according to an embodiment of the present invention. The type of the communication session, i.e., whether the communication session made by a customer is, but is not restricted to, a video session, a voice session, a Voice over Internet Protocol (VoIP), a text message, an email, an instant messaging, a web chat, and so forth. The contact managing computer system 228 further monitor static details about the communication session, for example, a customer selects input in an IVR menu of the contact center 100. Further, the contact managing computer system 228 monitors context of the communication session, according to an embodiment of the present invention by monitoring browsing history of the customer, in an embodiment of the present invention.

Further, the contact managing computer system 228 monitors a type of a customer, according to an embodiment of the present invention. In an exemplary scenario, a customer may be, but is not restricted to, a high priority or a gold customer, a medium priority customer, and/or a low priority or a silver customer. In an embodiment of the present invention, the monitoring module 232 may gather the type of a customer from the database 236. Furthermore, the contact managing computer system 228 monitors sentiments of the customer during the communication session, in an embodiment of the present invention. The sentiments may include, but is not restricted to, a positive sentiment, a negative sentiment, a neutral sentiment, and so forth. The contact managing computer system 228 also detects the sentiments in non-voice communication sessions, for example, text messages, emails, instant messages, web chats, and so forth.

In an embodiment of the present invention, parameters of a communication session may include, but are not restricted to, a type of a communication session, a type of a customer, static details of a communication session, sentiments of a customer, or a combination thereof. In an embodiment of the present invention, the contact managing computer system 228 monitors parameters of the communication session from an ongoing communication session in a real time environment. In another embodiment of the present invention, the contact managing computer system 228 monitors and/or gather parameters of the communication session from historical data and/or browsing history stored in a database such as the database 114 or the database 236. The contact managing computer system 228 monitors parameters of the communication session by mining data from ongoing interaction of the customer with a web page associated with the contact center 100. Further, the contact managing computer system 228 extracts keywords from the monitored parameters of the communication session, according to an embodiment of the present invention.

At step 404, the contact managing computer system 228 assigns a fuzzy value to each of the monitored parameters of the communication session, according to an embodiment of the present invention. The fuzzy value may indicate a value of each of the monitored parameters associated with the communication session of the contact center 100. In an embodiment of the present invention, the fuzzy value may be assigned as, but is not restricted to, low, average, high, huge, and so forth. In another embodiment of the present invention, the fuzzy value may be a numeric value such as 1, 5, 40, 90, and so forth.

Further, the contact managing computer system 228 computes a data value based on the monitored parameters of the communication session, according to an embodiment of the present invention. The data value may indicate a data value of the communication session, in an embodiment of the present invention. The contact managing computer system 228 computes a data value based on the monitored parameters by using fuzzy logic, in an embodiment of the present invention. In an exemplary scenario, if sentiment parameter is frustrated, type of customer is high then a fuzzy rule, for example, if-then fuzzy rule is applied to the fuzzy values of the monitored parameters:

If sentiment is frustrated AND type of customer is high then data value is high

At step 406, the contact managing computer system 228 determines attributes based on the computed data value of the communication session, according to an embodiment of the present invention. The determined attributes may indicate characteristics and/or skills required by an agent of the contact center 100 to provide customer services to customers. In an exemplary scenario, if data value of a contact priority is high then an attribute such as high skilled is determined for the communication session. Further, the contact managing computer system 228 determines multiple attributes based on the computed data value of the communication session, in another embodiment of the present invention.

Next, at step 408, the contact managing computer system 228 determines whether to determine more attributes of the communication session. If it is determined that more attributes are to be determined for the communication session then the method 400 returns to the step 402. Otherwise, the method 400 proceeds to step 410.

Thereafter, at step 410, the contact managing computer system 228 selects a resource based on the determined attributes, according to an embodiment of the present invention. The contact managing computer system 228 matches the determined attributes with characteristics and/or skills assigned to agents of the contact center 100 in order to select an appropriate resource for the communication session. The selected resource may be, but is not restricted to, a supervisor, an agent, a reserve agent, a Subject Matter Expert (SME), to name a few.

At step 412, the contact managing computer system 228 routes the communication session to the selected resource, according to an embodiment of the present invention. In an exemplary scenario, the communication session is routed to the selected resource of the contact center 100 if the selected resource is currently available. In another exemplary scenario, the communication session is routed to a queue if the selected resource is currently handling another communication session within the contact center 100.

Figure 5:
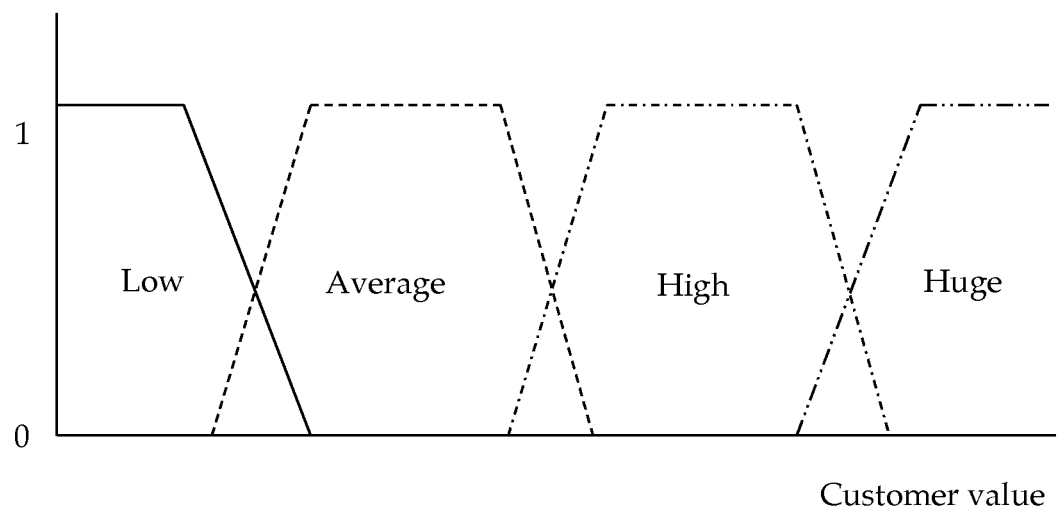
FIG. 5 illustrates an exemplary fuzzy logic graph of a communication session, according to an embodiment of the present invention.

FIG. 5 illustrates an exemplary fuzzy logic graph 500 of a communication session, according to an embodiment of the present invention. The X-axis of the fuzzy logic graph may display parameters of the communication session. As shown, the X-axis of the graph 500 indicates a customer value parameter of the communication session. The Y-axis of the graph 500 indicates a fuzzy value of the customer value parameter of the communication session. In an embodiment of the present invention, the fuzzy value of the parameters of the communication session may be fetched from the database 114 and/or the database 236 of the contact center 100.

Further, another fuzzy logic graph may be displayed on a supervisor's desktop that may aid the supervisor to manually select a resource for a communication session. The fuzzy logic graph may display a data value that is computed by the contact managing computer system 228. Based on the computed data value of the communication session, a list of attributes of a resource is also displayed on the supervisor's desktop. The supervisor may then select an appropriate resource for the communication session.

In an exemplary scenario, a customer is surfing on a web page and desire to communicate with an agent of a contact center 100. The contact managing computer system 228 monitor and/or gather parameters of the communication session. The parameters may include, but is not restricted to, a type of customer, time spent on the web page, number of items in a shopping cart, variation of categories of items in the shopping cart, sentiments, and so forth. Further, each of the monitored parameter is assigned a fuzzy value, as shown in the FIG. 5. Further, fuzzy rules are applied on the monitored parameters to compute a data value of the communication session. For example, if type of customer is low or number of items is small then contact priority of the communication session is low, if type of customer is average and sentiments of customer is angry, then contact priority of the communication session is average, or if type of customer is huge or sentiments of customer is angry or number of items in shopping cart is huge then contact priority of the communication session is high. The contact managing computer system 228 executes fuzzy rules and determines a data value such as contact priority. Further, if the contact priority is high, attributes associated with a high priority contact is determined such as proficient in techniques corresponding to mobile phones, five years of experience, and so forth. Thereafter, based on the determined attributes an agent having characteristics that matches with the attributes are selected for the communication session, and the communication session is routed to the selected agent.

The exemplary embodiments of this present invention have been described in relation to a contact center. However, to avoid unnecessarily obscuring the present invention, the preceding description omits a number of known structures and devices. This omission is not to be construed as a limitation of the scope of the present invention. Specific details are set forth by use of the embodiments to provide an understanding of the present invention. It should however be appreciated the present invention may be practiced in a variety of ways beyond the specific embodiments set forth herein.

Furthermore, while the exemplary embodiments of the present invention illustrated herein show the various components of the system collocated, certain components of the system can be located remotely, at distant portions of a distributed network, such as a LAN and/or the Internet, or within a dedicated system. Thus, it should be appreciated, that the components of the system can be combined in to one or more devices, such as a switch, server, and/or adjunct, or collocated on a particular node of a distributed network, such as an analog and/or digital telecommunications network, a packet-switch network, or a circuit-switched network.

It will be appreciated from the preceding description, and for reasons of computational efficiency, the components of the system can be arranged at any location within a distributed network of components without affecting the operation of the system. For example, the various components can be located in a switch such as a PBX and media server, gateway, in one or more communications devices, at one or more users' premises, or some combination thereof. Similarly, one or more functional portions of the system could be distributed between a telecommunications device(s) and an associated computing device.

Furthermore, it should be appreciated the various links connecting the elements can be wired or wireless links, or any combination thereof, or any other known or later developed element(s) that is capable of supplying and/or communicating data to and from the connected elements. These wired or wireless links can also be secure links and may be capable of communicating encrypted information. Transmission media used as links, for example, can be any suitable carrier for electrical signals, including coaxial cables, copper wire and fiber optics, and may take the form of acoustic or light waves, such as those generated during radio-wave and infra-red data communications.

Also, while the flowcharts have been discussed and illustrated in relation to a particular sequence of events, changes, additions, and omissions to this sequence can occur without materially affecting the operation of embodiments of the present invention.

A number of variations and modifications of the present invention can be used. It would be possible to provide for some features of the present invention without providing others.

For example in one alternative embodiment of the present invention, the systems and methods of this present invention can be implemented in conjunction with a special purpose computer, a programmed microprocessor or microcontroller and peripheral integrated circuit element(s), an ASIC or other integrated circuit, a digital signal processor, a hard-wired electronic or logic circuit such as discrete element circuit, a programmable logic device or gate array such as PLD, PLA, FPGA, PAL, special purpose computer, any comparable means, or the like.

In general, any device(s) or means capable of implementing the methodology illustrated herein can be used to implement the various aspects of this present invention. Exemplary hardware that can be used for the present invention includes computers, handheld devices, telephones (e.g., cellular, Internet enabled, digital, analog, hybrids, and others), and other hardware known in the art. Some of these devices include processors (e.g., a single or multiple microprocessors), memory, non-volatile storage, input devices, and output devices. Furthermore, alternative software implementations including, but not limited to, distributed processing or component/object distributed processing, parallel processing, or virtual machine processing can also be constructed to implement the methods described herein.

In yet another embodiment of the present invention, the disclosed methods may be readily implemented in conjunction with software using object or object-oriented software development environments that provide portable source code that can be used on a variety of computer or workstation platforms. Alternatively, the disclosed system may be implemented partially or fully in hardware using standard logic circuits or VLSI design. Whether software or hardware is used to implement the systems in accordance with embodiments of the present invention is dependent on the speed and/or efficiency requirements of the system, the particular function, and the particular software or hardware systems or microprocessor or microcomputer systems being utilized.

In yet another embodiment of the present invention, the disclosed methods may be partially implemented in software that can be stored on a storage medium, executed on a programmed general-purpose computer with the cooperation of a controller and memory, a special purpose computer, a microprocessor, or the like. In these instances, the systems and methods of this present invention can be implemented as program embedded on personal computer such as an applet, JAVA® or CGI script, as a resource residing on a server or computer workstation, as a routine embedded in a dedicated measurement system, system component, or the like. The system can also be implemented by physically incorporating the system and/or method into a software and/or hardware system.

Although the present invention describes components and functions implemented in the embodiments with reference to particular standards and protocols, it is not limited to such standards and protocols. Other similar standards and protocols not mentioned herein are in existence and considered to be included in the present invention. Moreover, the standards and protocols mentioned herein and other similar standards and protocols not mentioned herein are periodically superseded by faster or more effective equivalents having essentially the same functions. Such replacement standards and protocols having the same functions are considered equivalents included in the present invention.

The present invention, in various embodiments, configurations, and aspects, includes components, methods, processes, systems and/or apparatus substantially as depicted and described herein, including various embodiments, subcombinations, and subsets thereof. Those of skill in the art will understand how to make and use the present invention after understanding the present disclosure. The present invention, in various embodiments, configurations, and aspects, includes providing devices and processes in the absence of items not depicted and/or described herein or in various embodiments, configurations, or aspects hereof, including in the absence of such items as may have been used in previous devices or processes, e.g., for improving performance, achieving ease and/or reducing cost of implementation.

The foregoing discussion of the present invention has been presented for purposes of illustration and description. It is not intended to limit the present invention to the form or forms disclosed herein. In the foregoing Detailed Description, for example, various features of the present invention are grouped together in one or more embodiments, configurations, or aspects for the purpose of streamlining the disclosure. The features of the embodiments, configurations, or aspects may be combined in alternate embodiments, configurations, or aspects other than those discussed above. This method of disclosure is not to be interpreted as reflecting an intention the present invention requires more features than are expressly recited in each claim. Rather, as the following claims reflect, inventive aspects lie in less than all features of a single foregoing disclosed embodiment, configuration, or aspect. Thus, the following claims are hereby incorporated into this Detailed Description, with each claim standing on its own as a separate embodiment of the present invention.

Moreover, though the description of the present invention has included description of one or more embodiments, configurations, or aspects and certain variations and modifications, other variations, combinations, and modifications are within the scope of the present invention, e.g., as may be within the skill and knowledge of those in the art, after understanding the present disclosure. It is intended to obtain rights which include alternative embodiments, configurations, or aspects to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

What is claimed is:

1. A resource selection management computer system for selecting at least one agent, from among a plurality of agents, for a communication session in an enterprise, the system comprising:
   a processor;
   a memory in communication with the processor storing instructions executable by the processor, wherein the processor, when executing the executable instructions:
   monitors one or more parameters of the communication session;
   stores the one or more monitored parameters in a database;
   assigns a respective fuzzy value to each of the one or more monitored parameters;
   computes at least one data value of the communications session based on one or more of the respective fuzzy values by using at least one fuzzy logic rule;
   identifies at least one agent attribute based on the at least one computed data value; and
   selects the at least one agent from among the plurality of agents, the selected at least one agent having at least one attribute that matches the at least one determined agent attribute.

2. The system of claim 1, wherein the processor when executing the executable instructions, extracts one or more keywords form the one or more monitored parameters of the communication session.

3. The system of claim 1, wherein the processor, when executing the executable instructions, monitors the one or more parameters in a real time environment.

4. The system of claim 2, wherein the database further stores the one or more extracted keywords of the communication session.

5. The system of claim 1, wherein the processor, when executing the executable instructions, computes the at least one data value by utilizing data associated with the enterprise.

6. The system of claim 1, wherein the processor when executing the executable instructions matches the at least one identified agent attribute with at least one characteristic assigned to the at least one agent.

7. The system of claim 1, wherein the processor, when executing the executable instructions, enables a supervisor to select the at least one agent based on the at least one computed data value.

8. The system of claim 1, wherein the processor, when executing the executable instructions, routes the communication session to the selected at least one agent.

9. The system of claim 1, wherein the selected at least one agent is one of a reserve agent, an agent, a supervisor, or a Subject Matter Expert (SME).

10. A computer-implemented method for selecting at least one agent, from among a plurality of agents, for a communication session in an enterprise, the method comprising:
    monitoring, by a processor, one or more parameters of the communication session;
    storing, by the processor, the one or more parameters in a database;
    assigning, by the processor, a respective fuzzy value to each of the one or more monitored parameters;
    computing, by the processor, at least one data value of the communication session based on one or more of the respective fuzzy values by using at least one fuzzy logic rule;
    determining, by the processor, at least one agent attribute based on the at least one computed data value; and
    selecting, by the processor, the at least one agent from the among the plurality of agents, the selected at least one agent having at least one attribute that matches the at least one determined agent attribute.

11. The method of claim 10, comprising:
    extracting, by the processor, one or more keywords form the one or more monitored parameters of the communication session.

12. The method of claim 10, comprising:
    computing the at least one data value by utilizing data associated with the enterprise.

13. The method of claim 10, comprising:
matching, by the processor, the at least one determined agent attribute with at least one characteristic assigned to the selected at least one agent.

14. The method of claim 10, comprising:
routing the at least one communication session to the at least one selected agent.

15. A computer-implemented method for routing a communication session to at least one agent, from among a plurality of agents, of an enterprise, the method comprising:
monitoring, by a processor, one or more parameters of the communication session;
storing, by the processor, the one or more parameters in a database;
computing, by the processor, at least one data value of the communication session based on the one or more monitored parameters by using at least one fuzzy logic rule;
determining, by the processor, at least one agent attribute based on the at least one computed data value;
selecting, by the processor, the at least one agent based on the at least one determined agent attribute, the selected at least one agent having at least one attribute that matches the at least one determined agent attributes; and
routing, by the processor, the communication session to the at least one selected agent.

16. The method of claim 15, comprising:
assigning, by the processor, a respective fuzzy value to each of the one or more monitored parameters of the communication session.

\* \* \* \* \*